United States Patent [19]

Shinoazaki

[11] Patent Number: 4,740,798

[45] Date of Patent: Apr. 26, 1988

[54] TRANSFER-TYPE THERMAL PRINTING DEVICE

[75] Inventor: Atsushi Shinoazaki, Chiba, Japan

[73] Assignee: Ricoh Company, Ltd., Tokyo, Japan

[21] Appl. No.: 905,168

[22] Filed: Sep. 9, 1986

[30] Foreign Application Priority Data

Sep. 10, 1985 [JP] Japan ................................ 60-200340

[51] Int. Cl.[4] ......................... G01D 15/10; B41J 32/00

[52] U.S. Cl. ............................. 346/76 PH; 346/76 R; 400/194; 400/196; 400/198; 400/241.2; 400/120

[58] Field of Search ......................... 346/76 PH, 76 R; 400/194–202, 697.1, 241.2, 120

[56] References Cited

U.S. PATENT DOCUMENTS 4,504,840 3/1985 Evans et al. ................... 346/76 PH 4,580,142 4/1986 Matsushita etal. ................... 346/1.1

4,606,662 8/1986 Komplin ............................. 400/214

FOREIGN PATENT DOCUMENTS 57-150587 3/1981 Japan .................................. 400/120

*Primary Examiner*—Clifford C. Shaw

*Assistant Examiner*—Gerald E. Preston

*Attorney, Agent, or Firm*—Cooper & Dunham

[57] ABSTRACT

A transfer-type thermal printing device transfers the non-image portions of the inked side of the ribbon to an intermediate transfer medium. The remaining image portions of the inked side are then transferred to transfer paper at an image-transfer station using high pressure to improve the transfer. The back side of the ribbon which has already been used at the main transfer station can serve as the intermediate transfer medium.

15 Claims, 2 Drawing Sheets

TRANSFER-TYPE THERMAL PRINTING DEVICE

This invention relates to a transfer-type thermal printing device and more particularly relates to a transfer-type thermal printing device which uses an intermediate transfer medium.

BACKGROUND OF THE INVENTION

There are many transfer-type thermal printers in which ink is applied by thermal transfer to paper which has surface irregularities. For example, one type of such printers uses a ribbon including a releasing layer and a highly condensed ink material while another uses a force other than or in addition to that generated by ink adhesion to transfer ink from the ribbon to the transfer paper (for example, magnetic force and/or air force). In the former type, the ink material tends to adhere only or mainly to the convex or projecting portions of the surface irregularities in the paper while depressions tend to be covered with ink mainly due to the ink's cohesion force. This limits the choice of the ink material because of the need to control the cohesion force, which tends to be highly dependent on the ink's temperature. Accordingly, it can be difficult for such a machine to make full-color images. Further, such a machine can impose restrictions on the construction of the thermal head. In a device of the later type, printers using a magnetic force can encounter difficulties in full-color printing because the magnetic material tends to be dispersed in the inking material. Printers using an air force can be relatively expensive because the base film of the ink sheet comprises a porous material. Good effects can be obtained in such printers when high pressure is applied to the printing head, but this can limit the service life of the head.

OBJECTS OF THE INVENTION

An object of the invention is to provide a transfer-type thermal printing device which is different from the known prior art devices.

Another object of the invention is to provide a transfer-type thermal printing device with good ink transfer capabilities.

A further object of the invention is to provide a transfer-type thermal printing device with high ink transfer efficiency.

SUMMARY OF THE INVENTION

These and other objects of the invention are accomplished by a transfer-type printing device which has an intermediate image-transfer station at which the non-image portions of the ink member are transferred to an intermediate transfer medium, and a main image-transfer station at which the remaining, image portions of the ink member are transferred to transfer paper to form the desired image thereon.

Other objects of the invention will become apparent from the following description of the preferred embodiments when taken in conjuction with the accompanying drawing.

DETAILED DESCRIPTION OF A PREFERRED EMBODIMENT

Figure 1:
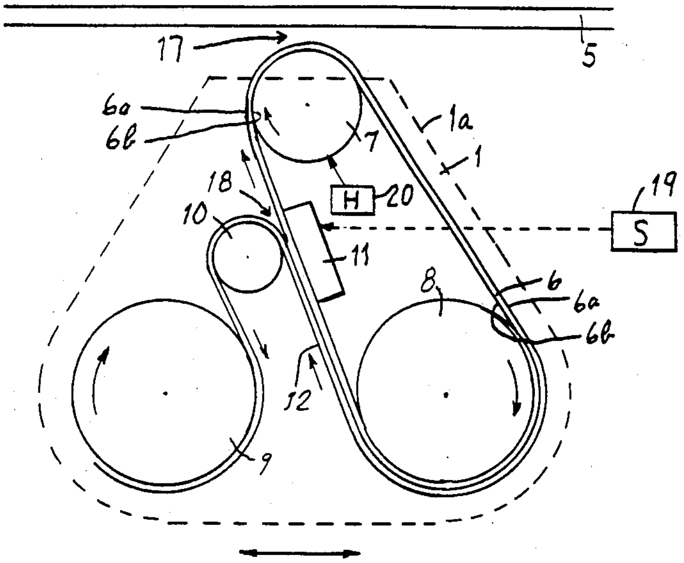
FIG. 1 illustrates a cartridge for thermal transfer of an image onto transfer paper in accordance with an embodiment of the invention.
Figure 2:
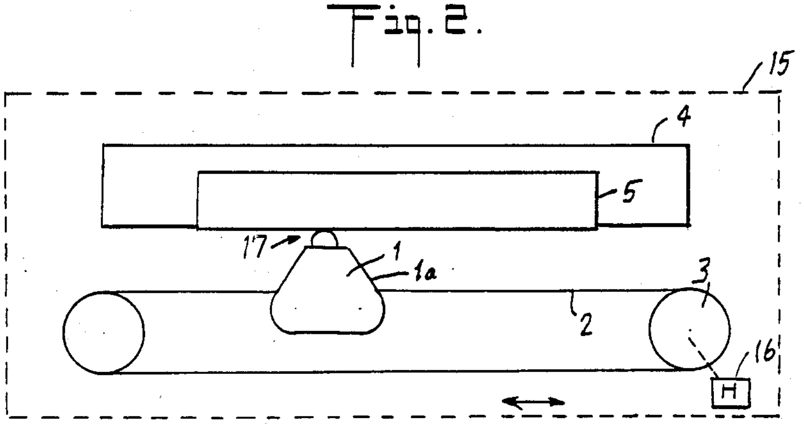
FIG. 2 illustrates the cartridge of FIG. 1 as used in a thermal printer in accordance with an embodiment of the invention.

Referring to FIGS. 1 and 2, a cartridge 1 is affixed to a driving wire or tape 2 which is trained on pulleys 3-1 and 3-2. The pulleys are rotatably mounted at predetermined positions to a printer schematically illustrated at 15. A driving means, such as a motor 16 driving pulley 3-1, moves wire or tape 2, and thus cartridge 1, to the left and to the right relative to a first platen roller 4 (as seen in FIG. 2). A main image-transfer station 17 is defined at the nip between cartridge 1 and first platen roller 4. Transfer paper 5 is moved up (and/or down) through main transfer station 17 (i.e. perpendicularly to the plane of FIG. 2) as known in the art.

Cartridge 1 contains, in a housing 1*a*, a ribbon 6 which is supplied from a supply in the form of a supply roller 8 and has a front or ink side 6*a* and a back or substrate side 6*b*. Fresh ribbon 6 is paid out from supply roller 8, which rotates clockwise, and forms a first ribbon run as it moves up along the left side of supply roller 8 (as seen in FIG. 1), with its front side 6*a* facing to the left, passes between an intermediate image-transfer station 18 defined between a thermal printhead 11 and a second pressure member in the form of a second platen roller 10, loops around a first pressure member in the form of a first pressure roller 7, then moves down along the right side of supply roller 8 and again loops over supply roller 8 (an over the roll of fresh ribbon 6 thereon. Ribbon 6 then starts a second ribbon run as it again goes up along the left side of supply roller 8 (and to the left of the first ribbon run up along the left side of supply roller 8), passes between thermal printhead 11 and the second platen roller 10, and thus through the intermediate transfer station 18, loops over the second platen roller 10, and is taken up and wound on a take-up roller 9. Each of rotatable rollers 7, 8, 9 and 1 and printhead 11 is mounted to cartridge housing 1*a*.

Note that the front or ink side 6*a* of ribbon 6 faces transfer paper 5 at the main transfer station 17, and that the back or substrate side 6*b* of the ribbon in the first run is pressed against printhead 11 at the intermediate transfer station 18. Note further that at the intermediate transfer station 18 the front or ink side 6*a* of the second (left) run of ribbon 6 faces the second platen roller 10 while the back or substrate side 6*b* of this second run of ribbon 6 faces and makes contact with the front of ink side 6*a* of the first run of ribbon 6 (the run which loops over both the supply roller 8 and pressure roller 7). In this arrangement, the second run of ribbon 10 serves as an intermediate transfer member or medium 12 as described below.

In operation of the device described above, ribbon 6 is paid out from supply roller 8 and moves along the first ribbon run through the nip between thermal printhead 11 and the second platen roller 10, at the intermediate image transfer station 17, where the non-image portions of ribbon 6 are heated by the action of the thermal printhead 11, to which electrical control signals are applied as known in the art. The printhead 11 can be a multielement, matrix thermal printhead of the type known in the art. The electrical signals, which can be supplied to the printhead 11 from a source 19 which is external to cartridge 1, energize selected heater elements to transfer the non-image portions of the ink from ribbon 6 to the intermediate transfer medium 12 at the intermediate transfer station 18. Since the front, inked side **6*a* of ribbon member 6 along the first run contacts the back, substrate side 6*b* of the second run of ribbon 6 at that position, ink material corresponding to the non-image portions is transferred to the back side 6*b* of the ribbon which is along the second ribbon run (i.e. the ribbon run which is leftmost in FIG. 1). The back side 6*b* of this second run of ribbon thus serves as an intermediate transfer medium 12, onto which are deposited, by thermal transfer, the non-image portions of the inked side 6*a* of the ribbon moving along the first ribbon run. Accordingly, only the image portions of the inked side 6*a* remain on the first run of ribbon 6 after the action thereon of the thermal printhead 11. Subsequently, ribbon 6 moves along the first run toward the pressure roller 7 and its inked side 6*a* contacts transfer paper 5, which is in the nip between pressure roller 7 and the first platen roller 4, i.e. at the main image-transfer station 17. At this image-transfer station, the image portion of the ink material is transferred by thermal transfer to transfer paper 5, and the pressure force generated by the pressure of pressure roller 7 against the first platen roller 4 helps the ink material flow into recesses of the surface irregularities in transfer paper 5, to thereby assure good ink coverage and ink-to-paper adhesion. This flow into recesses can be improved further if the ink material includes wax components designed to facilitate the flowing phenomenon. To improve the transfer rate, pressure roller 7 can be heated, as by a heater 20**, to a temperature near the melting point of the ink material. Such heating is preferable but not necessarily required.

After this main image-transfer operation, ribbon 6 again loops over supply roller 8 and then starts along the second ribbon run, to serve the function of intermediate transfer medium 12 at the intermediate image-transfer station 18, i.e. at the nip between printhead 11 and the second platen roller 10, where the back side **6*b* of the ribbon in the second run faces and contacts the front side 6*a* of the ribbon in the first run. After the intermediate thermal transfer (of non-image portions of the ink) at the nip between printhead 11 and the second platen roller 10, the ribbon continues its second run by looping over the second platen roller, and by being taken up and wound on take-up roller 9**.

Since the first pressure members 7 is a rotatable pressure roller in this embodiment, no abrasion difficulties are encountered at the main image-transfer station 17 even when high pressure is applied between the first platen roller 4 and the pressure roller 7. Accordingly, it is possible in this embodiment of the invention to cause particularly effective transfer of ink into recesses of the surface irregularities of the transfer paper 5. Usually, the ribbon member 6 includes a base or substrate layer of polyethylenetelefutalate, and a layer of ink material thereon. Image-transfer sensitivity for the intermediate image-transfer at station 18 is improved when the back side **6*b* of the base layer is made rough, with surface irregularities, such that material having a high melting point and high cohesion force can be used. When such material is used the ink transferred at the intermediate and main transfer station tends to bridge recesses into which it is unable to flow, to thereby improve the quality of the image on the transfer paper 5** and allow more effective transfer action.

If slippage (relative movement) occurs at the intermediate image-transfer station 18 between the first and second runs of ribbon 6, i.e. between the fresh ribbon 6 and the intermediate transfer medium 12, the edges of the ribbon which continues along the first run toward pressure roller 7 can pick up ink material which should have remained on the intermediate transfer medium 12. Such ink material picked up by the edges of ribbon 6 could then be deposited on transfer paper 5 at the main image-transfer station 17, contaminating the image thereon. In order to prevent such contamination, the width of the pressure member can be made less than that of ribbon 6. In this embodiment, a 0.5 mm wide margins at each edge of the ribbon 6 extends beyond the width of the pressure member 7 and is not pressed thereby against the transfer paper 5. Furthermore, as an additional measure for preventing such contamination, the width of the ink material layer of ribbon 6 is less than that of base layer, to leave non-inked margins along both edges of the front side of ribbon 6.

As is understood from the aforementioned explanation, the step of applying an image-signal to a thermal printhead is separated in time and space from the step of applying pressure against the ribbon and the transfer paper for image-transfer. Accordingly, relatively high pressure can be applied to the ribbon and the transfer paper in the main image-transfer step, with the result that an uneven surface of the paper can be made temporarilly even to facilitate effective image-transfer.

In this embodiment, the back side of the ribbon already used at the main image-transfer station 17 serves as the intermediate transfer medium at station. However, a separate intermediate transfer medium can be used instead in an alternate embodiment of the invention.

Printer 15 includes additional components known in the art, such as a mechanism (not shown) to space cartridge 11 from platen 4 and transfer paper 5 when no printing is to be carried out (e.g. in a back stroke of the printhead). It should be clear that the printer is timed such that the operation of the printhead 11 and the movement of ribbon 6 through the intermediate image-transfer station 18 are synchronized with the movement of cartridge 1 in its printing stroke along platen 4 such that the image portions of the inked side left on the ribbon after the action of printhead 11 will reach the main image-transfer station 17 at the desired position of the cartridge relative to platen roller 4.

Figure 3:
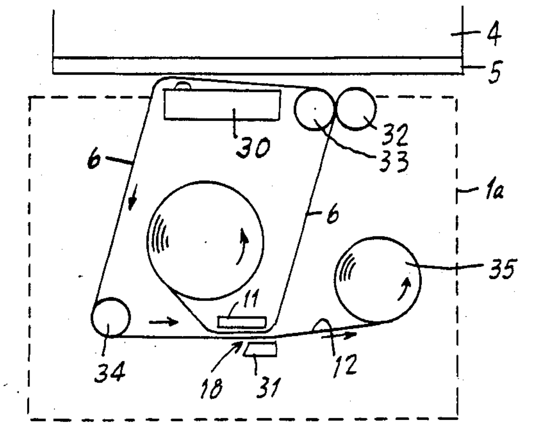
FIG. 3 illustrates a thermal printer using another embodiment of the invention.

FIG. 3 illustrates another embodiment of the invention, in which elements which correspond to parts of the embodiment of FIGS. 1 and 2 bear the same reference numerals. In FIG. 3 the first pressure member, at the main image transfer station 17, is a second printhead 30, used in place of the pressure roller 7 of the first embodiment. The second pressure member, used at the intermediate image-transfer station 18, is a stationary platen plate 31, used in place of the pressure roller 10 of the first embodiment. The second printhead 30 can use a single heating element, as the ribbon 6 carries only the image portion of the ink layer at the main transfer station 17. The second printhead 11 can be made of abrasion resistant material, and can be inexpensive, as its entire surface facing the ribbon 6 can be heated. In other respects the second embodiment can be the same as the first or, as illustrated in FIG. 3, the cartridge can comprise a supply roller 32, from which fresh ribbon 6 is paid out and passes through the intermediate image-transfer station 18, at which the non-image portions of the ink layer at the front side 6*a* of the ribbon 6 are transferred to the intermediate transfer medium 12 (the back side 6*b* of the run of ribbon 6 which has already passed through the main image-transfer station 17). The ribbon 6 then continues up along the right side in FIG. 3, then passes through the nip between a roller 32 (which can be driven by a motor, not shown) and a back-up roller 33, then passes through the main image-transfer station 17, where the image portions of the ink remaining on the ribbon 6 are transferred to paper 5, then continues down along the left side of FIG. 3, turns to the right over a roller 34, passes through the intermediate image-transfer station 18, where its back side serves as the intermediate transfer medium 12, and is taken up by a take-up roller 35. The cartridge illustrated in FIG. 3 can be in a cartridge housing 1*a*, and can move relative to platen 4 in the manner discussed in connection with cartridge 1 in the first embodiment.

Figure 4A:
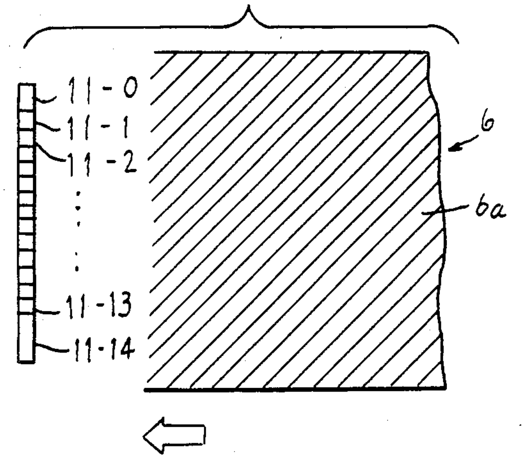
FIG. 4*a* illustrates a portion of the ink side of a ribbon which has passed through an intermediate thermal image transfer station but before the main image transfer operation.
Figure 4B:
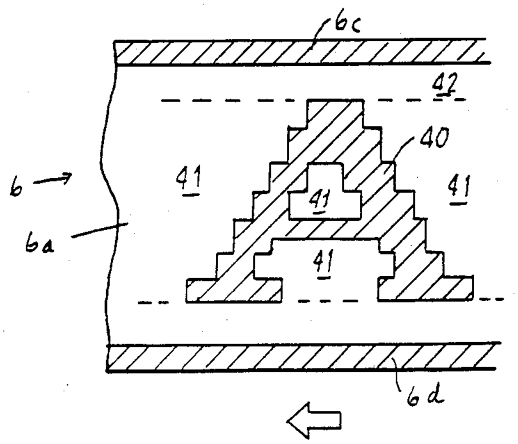
FIG. 4*b* illustrates a portion of fresh ribbon and its spatial relationship to an exemplary thermal printhead at the intermediate image transfer station.

FIG. 4*a* illustrates the front side 6*a* of a portion of ribbon 6 moving toward the printhead 11 which comprises heating elements 11-0 through 11-14 and is at the intermediate image-transfer station 18. The front side 6*a* at this time is covered with and ink layer (in this exemplary embodiment). The end elements 11-0 and 11-14 of printhead 11 are energized (heated) at all times, while the intermediate elements 11-1 through 11-13 can be energized or not (heated or not) selectively, in accordance with an image signal. If the image signal is for the letter A, then this portion of the ribbon can be as illustrated in FIG. 4*b* after passage through the intermediate image-transfer station 18. Because the printhead 11 is shorter than the width of the ribbon, two margins of ink material 6*c* and 6*d* remain in the ribbon. Because of image signal applied to the heating elements 11-1 through 11-13, ink material remains at the image area 40, but has been transferred to the intermediate transfer medium 12 from the areas 41 which are within the dashed lines. Because of the constantly energized heating elements 11-0 and 11-14, the ink material has been removed from the strips 42 and 43. Note that the constantly energized heating elements 11-0 and 11-14 allow for satisfactory operation even when the printhead 11 and the ribbon 6 are somewhat misaligned in the vertical direction in FIG. 4*a*, by leaving a strip of non-ink areas (42 and 43) on each side of the image. Thus, if the first pressure member (the roller 7 in the first embodiment or the second printhead 30 in the second embodiment) has a width (in the vertical direction in FIG. 4*a*) which is greater than the height of the image portion 40 but less than the distance between marginal ink strips 6*c* and 6*d*, no ink material other than the image portion 40 is likely to be transferred to the paper 5 even when there is some vertical misalignment between the ribbon 6 and the first pressure member (7 or 30) at the main transfer station 17.

While the above provides a full and complete disclosure of the preferred embodiment of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. Apparatus comprising:

a first pressure member which defines one side of a main image-transfer station;

a thermal printhead and a second pressure member defining therebetween an intermediate image-transfer station;

a supply of thermal printing ribbon which has a front, inked side and a back, non-inked side;

means for moving the ribbon along a first run from the supply through the intermediate image-transfer station, for transfer thereat of non-image portions of the ink on the inked side to an intermediate transfer medium, and then through the main image transfer station, for transfer thereat of image portions of the ink remaining on the inked side of the ribbon to a main transfer medium, to thereby leave used-up ribbon emerging from said main image transfer station, wherein the back side of the ribbon faces the thermal printhead at the intermediate image-transfer station and faces the first pressure member at said main image-transfer station; and a supply for supplying said used-up ribbon moving along a second run which passes through the intermediate image-transfer station, between the first run of the ribbon and the second pressure member, wherein at the intermediate transfer station the back, non-inked side of the used-up ribbon faces and is pressed against the front, inked side of the ribbon moving along said first run, and the non-image portions of the ink at said front side of the ribbon moving along said first run are transfer-printed onto said back side of the used-up ribbon moving along said second run, and wherein said used-up ribbon thereby serves as an intermediate transfer medium.

2. Apparatus as in claim 1 in which said first pressure member comprises a first, rotatable pressure roller.

3. Apparatus as in claim 1 including means for heating the inked side of the ribbon at said first pressure member to facilitate thermal transfer of the image portions of the ribbon at said main image-transfer station.

4. Apparatus as in claim 1 in which said ribbon comprises an ink layer on a base layer and the side of the base layer facing away from the ink layer forms said back side of the ribbon and has surface irregularities.

5. Apparatus as in claim 1 in which the dimension of said first pressure member in the direction transverse to the length of the ribbon is less than the width of the ribbon at said main image-transfer station.

6. Apparatus as in claim 1 including a first platen roller facing the first pressure member to define said main image-transfer station therebetween, and means for causing relative motion between the main pressure member and the first platen roller and for selectively energizing the thermal printhead to carry out thermal printing of a selected image on transfer medium moved through the main image-transfer station.

7. Apparatus as in claim 1 in which the printhead comprises a column of heating elements extending in the direction of the width of the ribbon at the intermediate image-transfer station, wherein the elements intermediate those at the ends of the column are energized selectively to transfer to the intermediate transfer medium the non-image portions of the inked side which are along an image strip of the ribbon which extends along the length of the ribbon and is as wide and the height of the portion of the column of said heating elements made of said intermediate elements, and wherein the end elements are energized to transfer to the intermediate transfer medium the inked side of the ribbon which is aligned with said end elements, the thereby flank said image strip with two non-image strips from which the inked material has been transferred to the intermediate transfer medium.

8. Apparatus as in claim 1 in which the dimension of the printhead in the direction of the width of the ribbon at the intermediate transfer station is less than the width of the ribbon, and the printhead is nominaly centered relative to the ribbon, to leave marginal strips of ink material on the ribbon which has passed through the intermediate image-transfer station.

9. Apparatus as in claim 1 in which the first pressure member comprises a second printhead.

10. Apparatus as in claim 9 in which the second printhead has a single heating element.

11. Apparatus as in claim 9 in which the surface of the second printhead which faces and makes contact with the ribbon is made of a material having substantially higher resistance to abrasion than the printhead which is at the intermediate transfer station.

12. Apparatus as in claim 1 in which the second pressure member comprises a platen plate.

13. A cartridge comprising:

a housing, a thermal printhead mounted to the housing, and a supply roller, a pressure roller, a platen roller and a take-up roller all rotatably mounted to the housing;

wherein the platen roller and the thermal printhead face each other and define therebetween an intermediate image-transfer station, and a portion of the pressure roller extends from the housing and defines one side of a main image-transfer station; and a ribbon wound on said supply roller and having an inked side and a back side, and paid out from the supply roller, then passing in a first run through the intermediate image transfer station, with the back side of the ribbon facing the printhead, then through the main image-transfer station, with the back side of the ribbon facing the pressure roller and the inked side facing the main image-transfer station, then back over the supply roller, then in a second run through the intermediate image transfer station, between the platen roller and the first run of the ribbon through the intermediate image-transfer station, and then to the take-up roller;

wherein the non-image portions of a desired image can be transferred from the first run to the second run of the ribbon at the intermediate image-transfer station and the remaining image portions can be transferred from the ribbon to a transfer medium at the main image-transfer station.

14. A thermal image-transfer printer comprising:

a main platen and a cartridge defining therebetween a main image-transfer station;

said cartridge comprising a first pressure member which faces the main platen and defines one side of said main image-transfer station, a thermal printhead and a second pressure member defining therebetween an intermediate image-transfer station, and a supply of thermal printing ribbon which moves along a first run from the supply through the intermediate image-transfer station and then through the main image transfer position and has an inked side and an opposite, back side which faces the thermal printhead at the intermediate image-transfer position and the first pressure member at said main image-transfer position; and a supply of intermediate transfer medium which moves along a second run which passes through the intermediate image-transfer position, between the first run of the ribbon and the second pressure member;

wherein the printhead can cause the ribbon to transfer non-image portions of the inked side to the intermediate transfer medium at the intermediate image-transfer station by thermal transfer printing, leaving image portions to be transferred to a transfer medium held between the cartridge and the main platen at the main image-transfer station.

15. A printer as in claim 14 in which the supply of intermediate transfer medium is a part of the cartridge and the intermediate transfer medium comprises the back side of the ribbon which has already passed through said main image-transfer station.

* * * * *